(No Model.) 2 Sheets—Sheet 2.
H. LA M. LOCKE.
DEVICE FOR CLEANING STABLES.
No. 442,064. Patented Dec. 2, 1890.
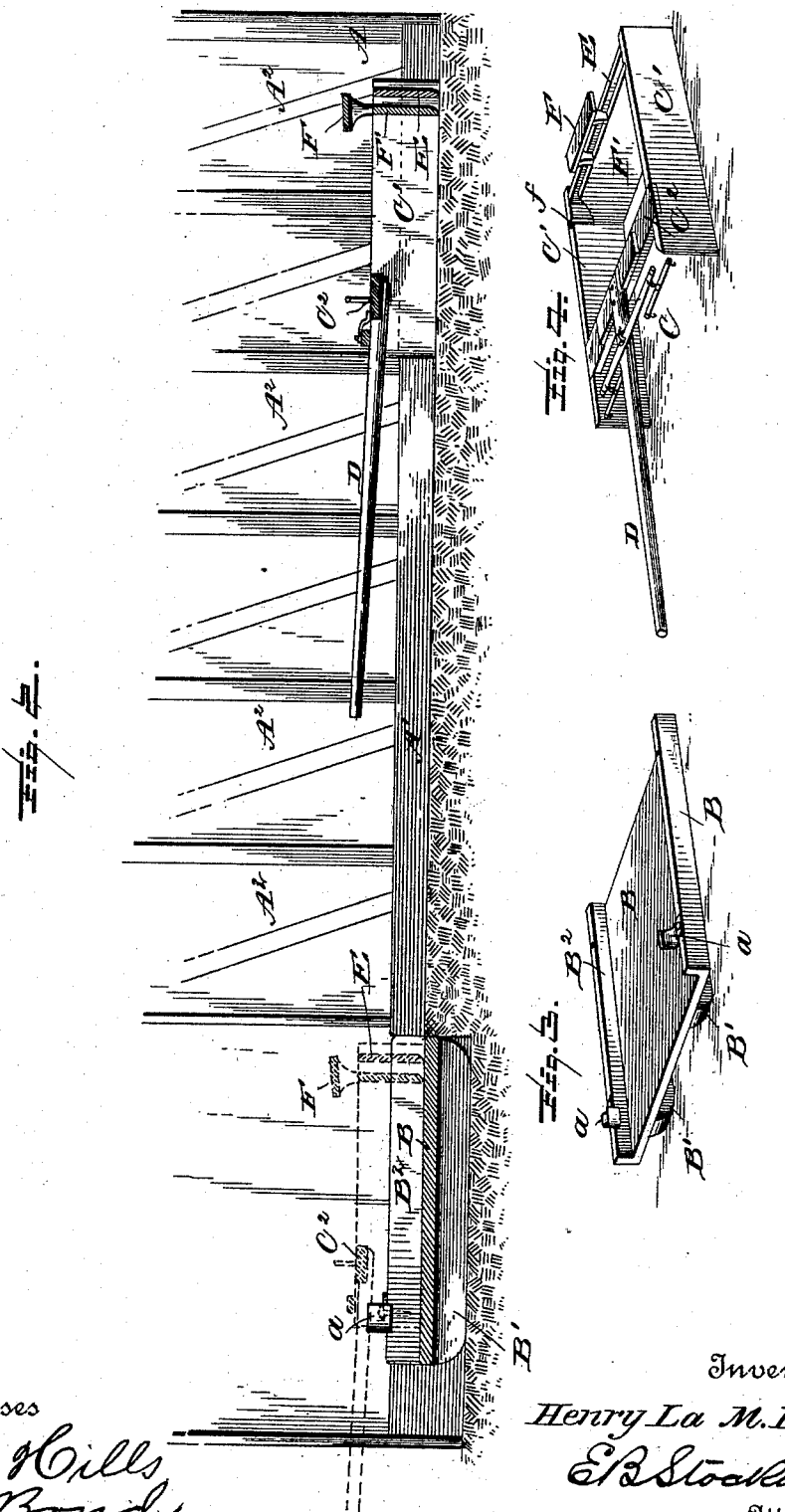
Witnesses
L. C. Hills
E. A. Bond
Inventor:
Henry La M. Locke,
E. B. Stocking
Attorney

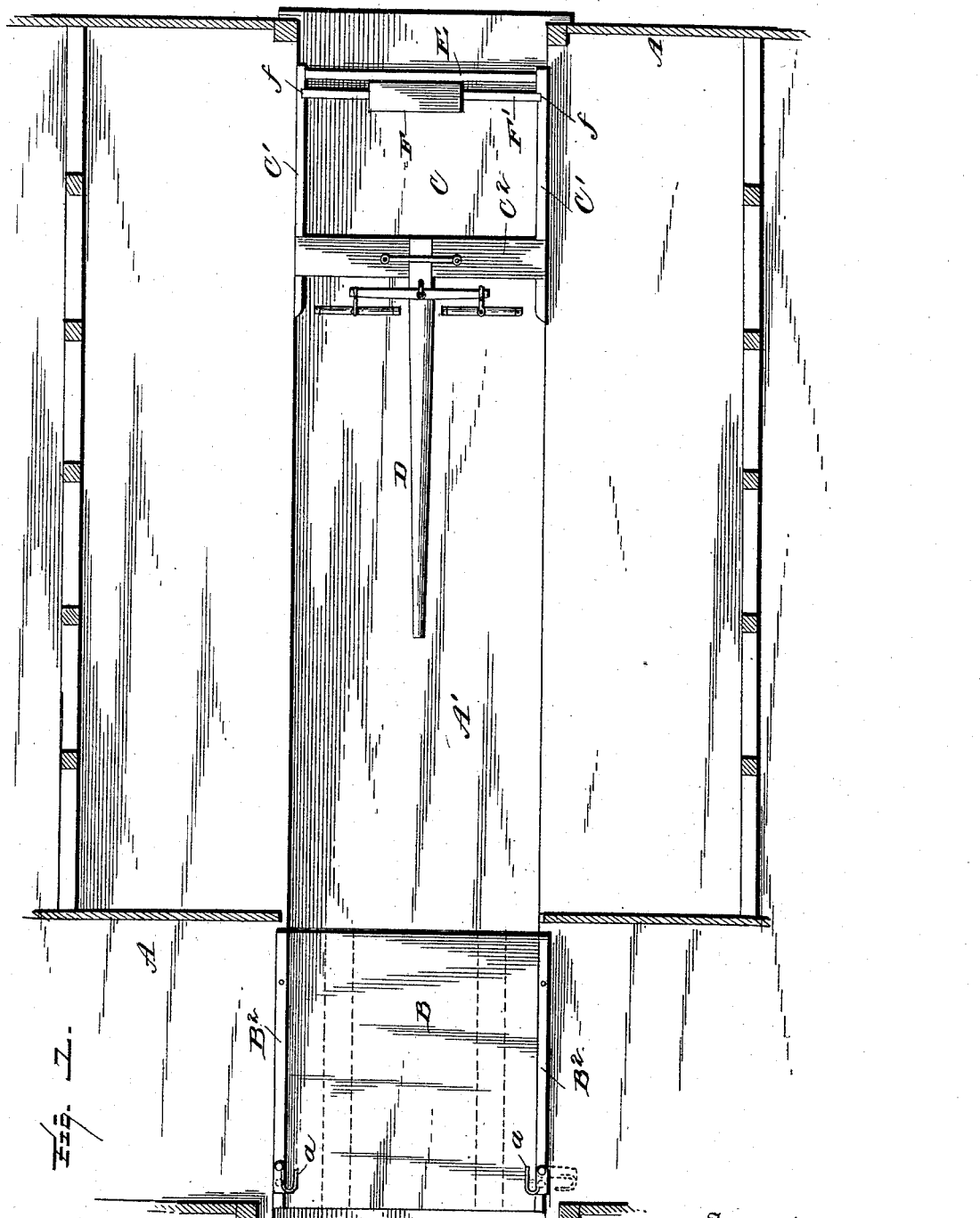

UNITED STATES PATENT OFFICE.

HENRY LA M. LOCKE, OF RICHFIELD, NEW YORK.

DEVICE FOR CLEANING STABLES.

SPECIFICATION forming part of Letters Patent No. 442,064, dated December 2, 1890.

Application filed February 6, 1890. Serial No. 339,386. (No model.)

*To all whom it may concern:*

Be it known that I, HENRY LA M. LOCKE, a citizen of the United States, residing at Richfield, in the county of Otsego and State of New York, have invented certain new and useful Improvements in Devices for Cleaning Stables, of which the following is a specification, reference being had therein to the accompanying drawings.

This invention relates to certain new and useful improvements in devices for cleaning stables, this being the primary object of the devices hereinafter described, although they are capable of use for handling other substances and in other places.

The invention has for its object, among others, to provide a simple and efficient means for removing the excrement or manure from stables or barns and conveying the same to the field or other place of deposit with as little handling as possible, avoiding the employment of hand-shovels.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a plan view of a portion of a stable or barn, showing my improvements or appliances. Fig. 2 is a central longitudinal vertical section through the same. Fig. 3 is a perspective view of the sled removed. Fig. 4 is a like view of the shovel.

Like letters of reference indicate like parts throughout the several views.

Referring now to the details of the drawings by letter, A designates a portion of a stable or barn, preferably with a runway A' extending substantially centrally therethrough, with a platform upon each side thereof, in the present instance being shown as fitted for cows, having stanchions $A^2$ for this purpose; but it will of course be understood that the appliances hereinafter described are equally as well adapted for use where horses are stabled.

Where only one platform and one row of cows or horses are arranged in the stable, a runway should be provided at the rear of the cows; but in this instance the runway would not of necessity be as wide as where the two rows are provided, and consequently the shovel would be narrower. In all cases, however, the runway should be about four inches lower than the floors or platforms on which the animals stand, so as to give room for droppings or excrement below, and the shovel should fit the runway so as to gather all the manure.

B is a sled designed to be arranged at the outer end of the runway, preferably in a pit below the surface of the runway, so as to bring the upper face or platform of the sled on a level with the floor of the runway, as shown best in Figs. 1 and 2. This sled is provided with runners B', having both ends alike, so that it will run either way, with either end ahead. The sled has also side-boards $B^2$, which extend a short distance above the platform, as shown in Fig. 3, the said side-boards having a space between them equal to the width of the shovel, soon to be described. This sled may form a part of the runway, or where there is lack of room in the stable or barn it may form rather a continuation of the said runway, being arranged outside the stable or barn, if desired. In either case the operation is the same.

C is the shovel. It consists, essentially, of the side blades C', the forward or acting ends of which are beveled inward toward the interior of the space inclosed by said side blades, as shown in Fig. 4, the said side blades being braced by the transverse bar or cleat $C^2$, secured to the upper edges thereof in any suitable manner. To this cleat (or it may be otherwise secured, if desired) is the end of the pole D, provided with the usual doubletree and necessary accessories for the attachment of the draft, and of course it will be understood that when only one animal is employed to propel the shovel, thills will be substituted for the pole. This, however, is a matter immaterial to the other features. The shovel should be substantially the same width as the runway, being sufficiently narrower of course to allow free movement of the shovel without undue friction. The rear ends of the side blades of the shovel are connected by means of the transverse vertical blade E, the lower edge of which is preferably sharpened, as shown in Fig. 2.

F is the driver's seat on the shovel. This is carried by a separate blade F' immediately in front of the rear end board, as shown in Figs. 2 and 4, and free to move up and down in suitable guide-grooves $f$ in the side blades of the shovel, as shown in the latter figure. The weight of the driver holds the blade of the shovel in operative position in contact with the floor of the runway. The supplemental blade is important, as I have found that a single blade will not always scrape the floor of the runway clean. By my construction the two blades thoroughly remove everything from the floor of the runway.

The operation is simple and apparent. When the shovel is not in use, it may be suspended at the rear end of the runway or disposed of otherwise, as most convenient. In the morning, or at any other time, when it is desired to clean the stable the shovel is lowered into the runway, as shown in Figs. 1 and 2, and the horse or horses attached, the driver takes his seat, and the horses are started. The movement of the shovel causes the same to gather all the manure in the runway, leaving it clean, the rear blade scraping all the manure from the floor of the runway and the sharpened edges of the front end of the side blades gathering whatever may accumulate on the sides of the runway. All that is gathered is confined between the rear and side blades of the shovel, and in the further movement of the shovel the latter, together with the collected manure, has been deposited upon the sled at the outer end of the runway. As the shovel gets fully on the sled it has taken on the latter all the gathered manure, and the forward ends of the side blades catch in loops or other suitable holders $a$ on the side bars of the sled, and the shovel is thus locked fast to the sled and any further movement of the shovel necessarily carries the sled with it. The sled and its contents are then removed to the field or other desired place of deposit, having reached which the manure may be automatically dumped in the following manner: The driver slightly backs the horse or horses enough to loosen the contact of the nose of the shovel with the locking means on the sled, when, having swung the locking-holders laterally out of the path of the shovel, the forward movement of the horses draws the shovel off the sled, sweeping with it the load of manure and dropping it in a heap on the ground. After replacing the shovel on the sled after dumping the manure, the driver takes them back to the barn, leaving the sled in the position at the end of the runway ready for the next day's repetition of this procedure.

The holders $a$ on the side-boards of the sled are preferably so arranged that they may be readily moved to the opposite end of the sled by changing each iron to the opposite side of the sled, although any form of locking mechanism may be used for the purpose of automatically locking the shovel to the sled as it is drawn onto the same.

What I claim as new is—

1. A stable-cleaning device consisting of side and end scrapers forming a bottomless receptacle between them, the side scrapers having vertically-disposed scraping-edges at their forward ends and the end scraper having a scraping-edge on its under side, as set forth.

2. A shovel adapted to the runway of a stable and provided with a rear blade, a loosely-mounted vertically-movable supplemental blade, and a driver's seat thereon, as set forth.

3. In a stable, the combination of a sled constructed as a continuation of the runway and adapted to receive and form the bottom of a shovel, and provided with mechanism for locking the shovel thereon, with a bottomless shovel, as set forth.

4. The combination, with a stable-shovel constructed to receive and transport the manure, of a transporting device adapted to be located at the end of the stable-runway and constructed to receive the loaded shovel, and having locking means thereon whereby the shovel is automatically locked to the transporting device when it is moved thereon and the two may be moved forward by the same motive power, substantially as specified.

5. The combination, with a shovel consisting of vertically-disposed side and end scrapers, whereby a bottomless receptacle is formed between them and the shovel is adapted for use in a stable-runway, of a transporting device adapted to be located at the end of the runway and to receive and form a bottom for the filled shovel, the said device having locking means whereby the shovel will be automatically locked to the transporting device when it is moved thereon and the two may be drawn forward by the same motive power, substantially as specified.

In testimony whereof I affix my signature in presence of two witnesses.

HENRY LA M. LOCKE.

Witnesses:
L. H. FROST,
E. D. OSTRANDER.